US012782204B2

(12) United States Patent
Cao et al.

(10) Patent No.: US 12,782,204 B2
(45) Date of Patent: Nov. 3, 2026

(54) THERMAL PROCESS MONITOR

(71) Applicant: Shanghai GND eTech Co., Ltd., Shanghai (CN)

(72) Inventors: Liansheng Cao, Shanghai (CN); Wenlong Zhu, Shanghai (CN)

(73) Assignee: Shanghai GND eTech Co., Ltd, Shanghai (CN)

(*) Notice: Subject to any disclaimer, the term of this patent is extended or adjusted under 35 U.S.C. 154(b) by 293 days.

(21) Appl. No.: 18/663,037

(22) Filed: May 13, 2024

(65) Prior Publication Data

US 2025/0347567 A1 Nov. 13, 2025

(51) Int. Cl.
*G01K 5/48* (2006.01)

(52) U.S. Cl.
CPC .................................... *G01K 5/48* (2013.01)

(58) Field of Classification Search
CPC ...................................................... G01K 5/48
See application file for complete search history.

(56) References Cited

U.S. PATENT DOCUMENTS

2016/0160000 A1* 6/2016 Sakabe .................... C09D 5/00
521/149
2019/0368944 A1* 12/2019 Jensen ..................... G01K 3/14

* cited by examiner

*Primary Examiner* — John E Breene
*Assistant Examiner* — Janice M Soto

(57) ABSTRACT

A thermal process monitor is provided for determining thermal characteristics in a heating process. The monitor comprises a compartment attached to an enclosed elongated housing, wherein the compartment is filled with a temperature sensitive powder-like material. The material is expandable in response to increase in temperature, resulting in its volume expansion into the elongated housing, and the volume expansion is irreversible against a subsequent decrease in temperature. The monitor also includes a reading device to read the volume expansion and to determine the thermal characteristic in a heating process.

12 Claims, 8 Drawing Sheets

PRIOR ART

PRIOR ART

THERMAL PROCESS MONITOR

BACKGROUND OF THE INVENTION

The present invention relates generally to thermal process monitoring devices, and finds particular applications in high temperature and harsh environment. It is to be understood, however, that it also finds applications in other usage scenarios, and is not necessarily limited to the aforementioned exemplary embodiment.

A thermal process monitor plays a critical role in various industrial applications. For example, in a semiconductor manufactory, it is crucial to maintain a specific temperature during a fabrication process such as material deposition, dopant diffusion, oxidation or crystal growth. Temperature monitoring and profiling across a semiconductor fabrication tool in these processes provide indispensable capability for maintaining precision, uniformity, and reliability of semiconductor device properties. Other examples of high temperature monitoring applications include metal and ceramics product fabrications, combustion engine operation and so on.

However, there are various challenges to perform temperature sensing in a very high temperature operation environment. One of the challenges is to have the sensor material maintain its stability against the high temperature. Some types of conventional temperature sensors such as thermocouples and thermal resistive sensors are not reliable in a very high temperature environment. Another challenge is to operate a sensor reliably for a long period of time under a harsh condition related to a reactive and/or corrosive chemical ambient, which are detrimental to structural and electronic materials. It is difficult to protect the sensor while getting accurate temperature measurement. Furthermore, in certain operation environment, the high temperature element to be monitored is in a motion state. For example, it is typical in a semiconductor fabrication tool that substrates are mounted on a rotation stage to achieve uniform etching or deposition performance. It is a challenge to probe temperature of these substrates during fabrication process.

Currently, optical pyrometers such as IR (infrared detector) provide a solution to mitigate the challenges of temperature sensing under a very high temperature and harsh conditions. This optical measurement is based on the principle that the intensity of light received by the observer depends upon the temperature of the light source at a given distance. A typical pyrometer has an optical system and a detector. The optical system focuses the thermal radiation from a target onto the detector. The target temperature can be derived according to the thermal radiation obtained from the output of the detector. The main advantage of this device is the non-contact measurement and the device can be placed outside of the harsh environment. However, the accuracy of pyrometer measurement relies on the information of the emissivity of the target. Unfortunately, the emissivity of the target surface is often unknown. In addition, scattered ambient light may also affect measurement accuracy.

In a high temperature fabrication industry such as in kilns, furnaces, and other high-temperature processes, the Bullers Ring, also known as a pyrometer ring, is developed to monitor a thermal process. It consists of a small, precisely manufactured ceramic ring that undergoes predictable changes in size with temperature variations. This property allows it to be used as a reference for measuring the temperature of the surrounding environment. As shown in FIG. 1, a micrometer 120 is used to measure changes in the outer diameter of a prior art process temperature control ring 110, made by Prairie Ceramic Corporation. A small change in the diameter is used to determine the temperature of the environment in which the ring is placed. The Bullers Ring's ability to withstand high temperatures and provide consistent measurements make it an inexpensive and indispensable component of thermal monitoring systems. However, since the change in dimension is usually small, a precise dimension measurement is required.

In view of the above challenges, there remains a need in art for a thermal process monitor that is reliable in a high temperature and harsh environment while at the same time provides indication of the temperature it experienced.

SUMMARY OF THE INVENTION

According to one aspect of the present disclosure, a thermal process monitor comprises a compartment attached with an enclosed elongated housing. The compartment is filled with a temperature sensitive powder-like material that expands in response to increase in temperature, and the expansion is irreversible when the temperature is decreased subsequently. The monitor further includes a reading device to read the volume expansion and to determine the thermal characteristic in a heating process.

In accordance with another aspect of the present disclosure, the elongated housing attached to the compartment of the thermal process monitor, can be penetrated by an electromagnetic field or visible light so that the volume of the expanded temperature sensitive material can be measured to indicate the rate of the expansion.

In accordance with another aspect of the present disclosure, functional particles, such as fluorescent particles, magnet particles, electric conductive particles, or electrophoretic particles may be embedded in the temperature sensitive powder-like material to indicate its expansion, with a corresponding device for measuring and recording the expansion.

In accordance with another aspect of the present disclosure, the temperature sensitive powder-like material can be in a form of flakes or microspheres, such as expandable graphite flakes or expandable polymer microspheres containing foaming agents.

In accordance with another aspect of the present disclosure, the thermal process monitor can be embedded in a silicon wafer or processing articles.

BRIEF DESCRIPTION OF DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

FIG. 4 is an illustration of the thermal process monitor embedded in a silicon wafer.

DETAILED DESCRIPTION OF THE INVENTION

Figure 1:
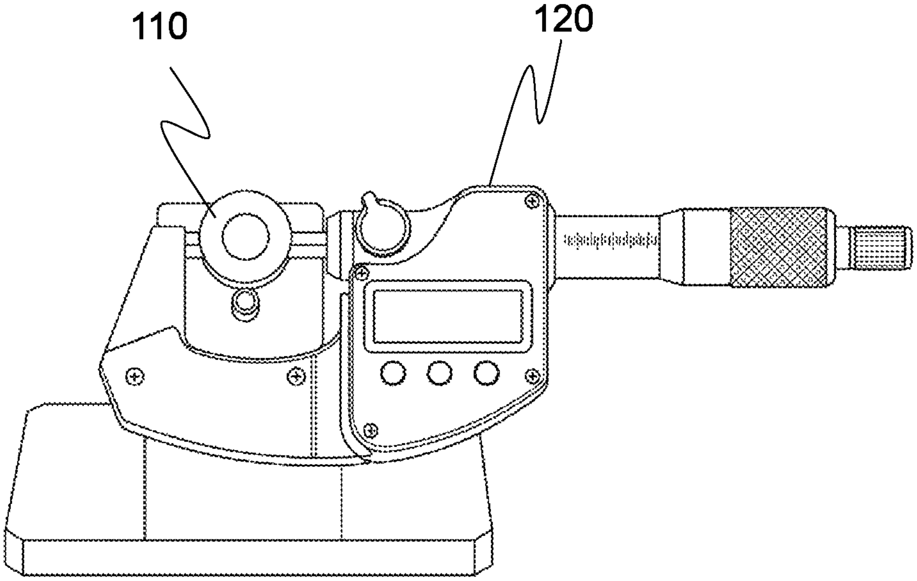
FIG. 1 is a prior art of a typical process temperature control rings.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one ordinary skill in the art and having possession of this disclosure, are to be considered within the scope of the invention.

Figure 3:
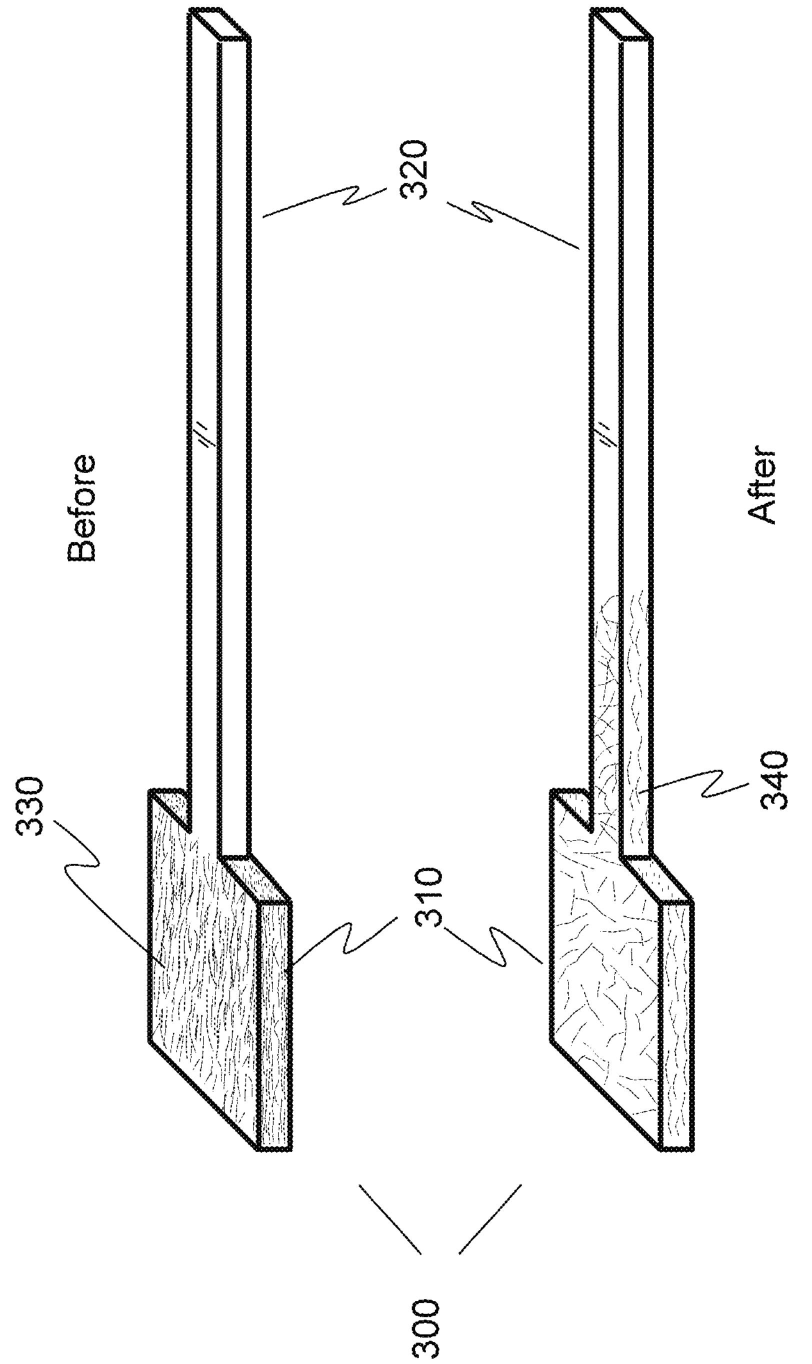
FIG. 3 is a perspective view illustrating a thermal process monitor based on thermally expandable powder-like elements according to one of the embodiments of the present disclosure.

One objective of the present invention is to provide a thermal process monitor which is capable of monitoring and recording thermal characteristic in a heating process. FIG. 3 illustrates a perspective view of a thermal process monitor 300 according to one of the embodiments. The monitor comprises a compartment 310 attached to an enclosed elongated housing 320. The elongated housing 320 is penetrable by electromagnetic field or visible light. The compartment is filled with a temperature sensitive powder-like material 330 which is expandable in response to increase in temperature resulting in its volume expansion into the elongated housing. Once the powder-like material is expanded, it is irreversible against a subsequent decrease in temperature. Therefore, the expanded volume 340 indicates the thermal characteristic in the heating process it has experienced.

Figure 2:
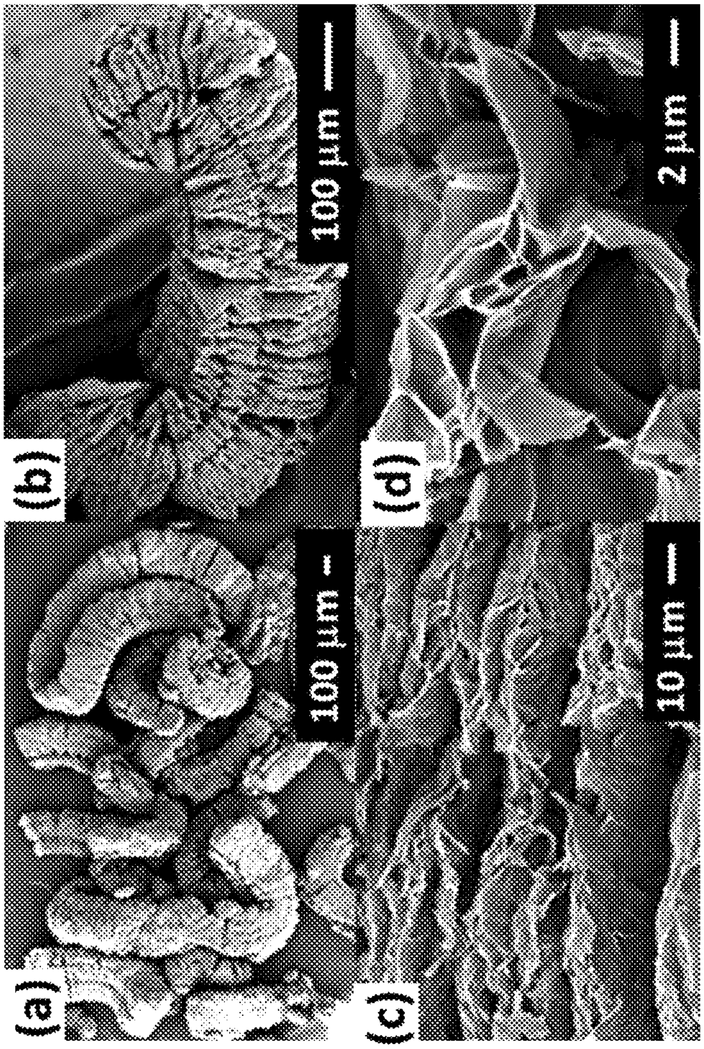
FIG. 2 is a prior art of microscopic views of expanded graphite flakes.

One example of the expandable powder-like material 330 is expandable graphite flakes which expands when exposed to a high temperature. Its expansion mechanism is based on the intercalation of gases generated between the layers of the graphite structure. When heated, the gas molecules, typically sulfuric acid or other intercalating agents, decompose or vaporize. As these gases are released, they penetrate between the layers of the graphite material, causing them to separate and expand. This expansion can be significant, leading to a foam-like or expanded structure with increased volume compared to its original state. Shown in FIG. 2 are prior art of SEM micrographs of expanded graphite with different magnifications from a reference article of Journal of Power Sources 378 (2018) 66-72. The expanded graphite flakes display a worm-like and a layer-by-layer structure with a large number of slit-shaped pores graphite plates.

In an alternative embodiment, the temperature sensitive powder-like material 330 comprises expandable polymer flakes or microspheres containing chemical foaming agents. Typical polymers for the powder-like materials include but not limited to microspheres of polystyrene, polypropylene, polyurethane, and polyvinyl chloride. The polymer can undergo a chemical forming process and expend at an elevated temperature. During this process, chemical foaming agents decompose at the processing temperature, releasing gas that expands the polymer. The expanded polymer is in a foam state with reduced density, resulting in an extended volume.

It is noticed that the volume expansion of the powder-like material depends on the size of flakes or microspheres, the type of the material, and the amount of intercalation or foaming agents. To achieved a predictable performance, a substantially uniform size is preferred. In addition, a smaller powder size tends to provide a large expansion ratio. In order to achieve a high sensitivity, a size smaller than 500 μm in on dimension is preferred.

An example for determining a thermal characteristic in a heating process with the monitor 300 is described as the following. The term of "thermal characteristic", as used herein, refers to a combination profile of temperature and heating time. In one embodiment, an optimized volume expansion is achieved to correlate to the heating performance and characteristics of the heating apparatus. The way of working is to make a number of runs with different settings of the temperature and time. These runs are characterized by the volume expansion of the monitor 300. Product quality analysis determines the optimal run and corresponding value of the volume expansion. In this way the estimated expansion value is related to a specific heating process. Once the optimal setting of the process parameters is found, the monitor 300 is used to control the process and to recognize deviations in time and temperature. In future runs the same reading of the volume expansion will guarantee the best reproducibility of the thermal process. Since the expanded volume is not going to be retracted by a subsequent decrease in temperature, the monitor can be used for a post process analysis.

In another embodiment for determining a thermal characteristic in a heating process with the monitor 300, is to distribute identical monitors throughout a heating apparatus. According to the value of volume expansion from each monitor, a temperature profile across the apparatus can be mapped. In addition, a temperature calibration can be performed with a conventional temperature sensor at certain locations. The calibration data can be used to derive the temperature level in various locations.

Furthermore, the volume expansion as a function of heating time can be recorded by a reading device, which will be described in the following paragraphs. This profile can be compared with a calibration run in the same heating process. With multiple measurements for different temperature sequences and at different locations, in connection with the calibration data, accurate temperature profiles in a heating apparatus can be extracted. Numerical data extraction is well known to those skilled in the art of computer simulation and need not be described in more detail herein.

Figure 4A:
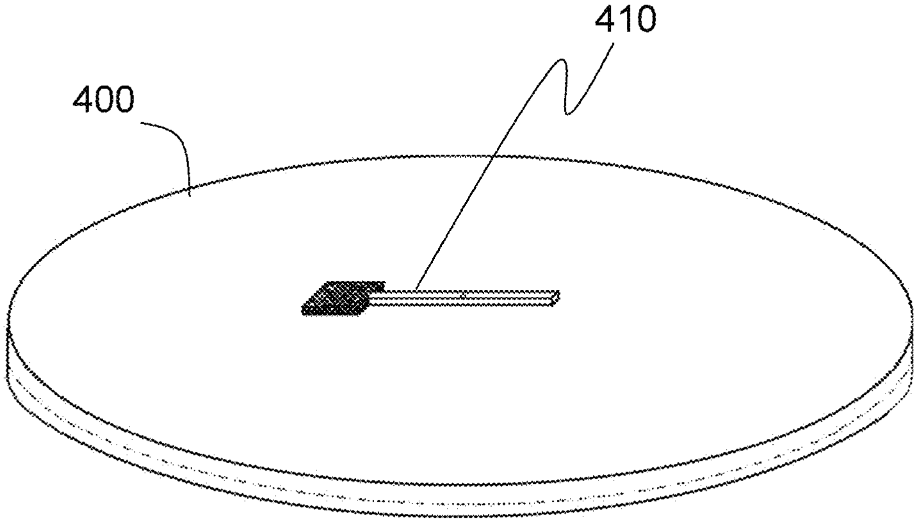
FIG. 4A is a perspective view and FIG. 4B is a cross sectional view.
Figure 4B:
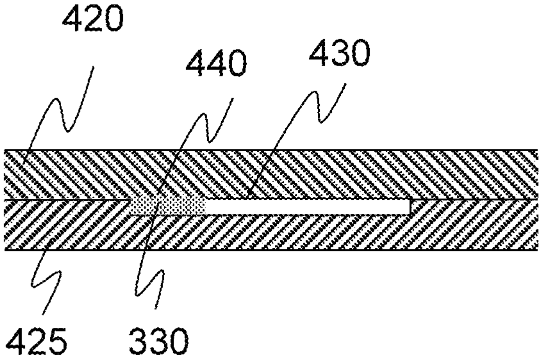

According to one of the embodiments of the present disclosure, the thermal process monitor can be embedded in a structure or device, as illustrated by FIG. 4A and FIG. 4B. FIG. 4A is a perspective view, showing that a thermal process monitor 410 is embedded in a silicon wafer 400. By inserting the process monitor inside or on the wafer, this enables process diagnosis and data acquisition under the same or similar conditions as the actual process wafer. FIG. 4B shows a cross section view of embedding the monitor in the silicon wafer. A silicon wafer can be split into upper half 420 and lower half 425. On the lower half 425, a recessed cavity is made to form compartment 440 and elongated portion 430. The powder-like material 330 is filled in the compartment 440. The upper half 420 is then bonded to the lower half 425 and this seals the cavity for the thermal process monitor. In an alternative embodiment, the thermal process monitor can be embedded in a mechanical structure or a moving part.

Figure 5:
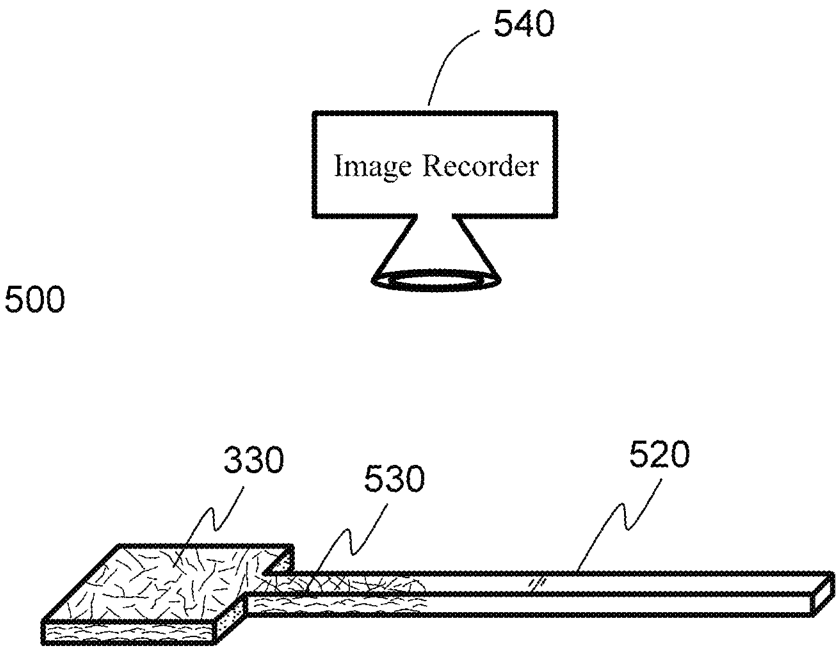
FIG. 5 is an illustration of using an image recorder to monitor expended volume of the powder-like material in the thermal process monitor.

As described above, the thermal process monitor relies on the volume expansion of the power-like material to determine a thermal characteristic. There are various examples for reading the volume expansion. In one embodiment, the elongated portion 520 of the thermal process monitor 500 is transparent or semi-transparent to visible light as shown in FIG. 5. The volume expansion 530 of the powder-like material 330 can be read directly. In one example, a distance marks (not shown) can be placed onto the elongated portion to indicate the value of expansion. In another example, an image recorder 540 can be arranged to record the volume expansion as a function of heating time. The recorded data can be used to extract a temperature profile as described above.

Figure 6A:
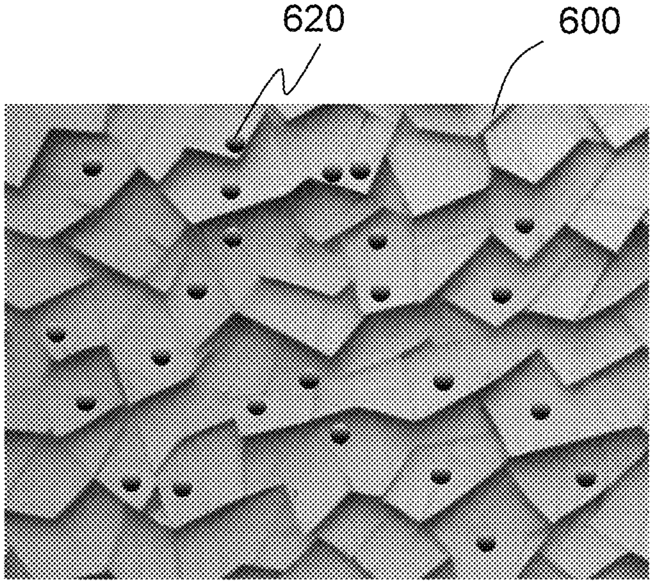
FIG. 6A and FIG. 6B illustrate expendable flakes embedded with functional particles.
Figure 6B:
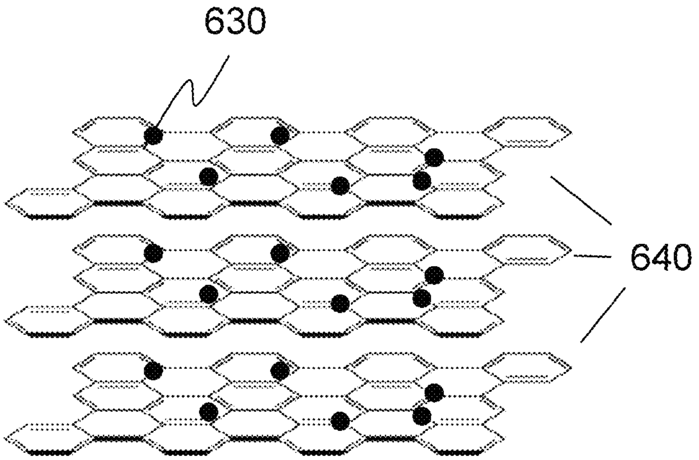

In an alternative embodiment, the powder-like material is embedded with functional particles to assist reading the volume expansion. The functional particles can be mixed with the powder-like material or chemically bonded with the material. FIG. 6A illustrates functional particles 620 are mixed with expandable graphite flakes 600. FIG. 6B depicts functional particles 630 bonded with the graphite lattice planes 640. During a heating process, these embedded functional particles will expand along with the powder-like material to indicate the expansion value in an operation environment.

Figure 7:
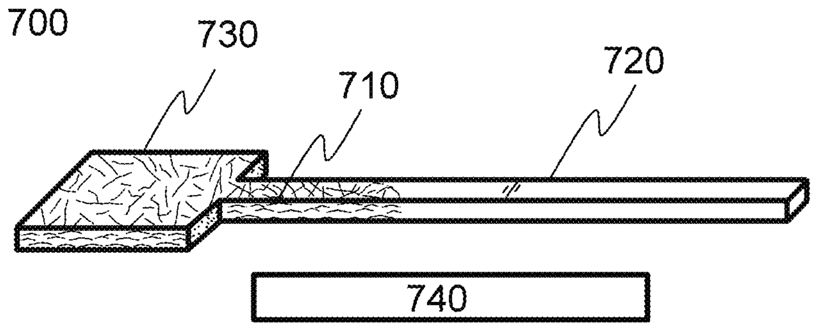
FIG. 7 illustrates using an optical sensor in accordance with one of the embodiments of the present disclosure.

In one embodiment, the embedded functional particles are fluorescent microspheres or nanoparticles that have the ability to absorb light at one wavelength and then re-emit it at a longer wavelength. One example is fluorescent silica nanoparticles, which are silica-based nanoparticles doped with fluorescent dyes. Referring to FIG. 7, the thermal process monitor 700 comprises a compartment 730 filled with an expandable powder-like material embedded with the fluorescent particles 710. When heated, the embedded fluorescent particles redistributed along with the expanded powder-like material into the elongated portion 720. The material of the wall of the elongated portion 720 is penetrable by light with various wavelength. The fluorescent particles can be excited by an external light source (not shown), or by energy emission from the processing environment. For example, in a plasma processing environment, plasma light can be a source for exciting fluorescent particles. The re-emit light from the fluorescent particles has distinct wavelengths which can be detected and recorded with an optical sensor 740 that targets at specific wavelength. Examples of the optical sensor include a CCD/CMOS camera and a distributed optical fiber sensor. By detecting light at specific wavelengths against the ambient noise, the measurement sensitivity of the volume expansion is greatly improved.

Figure 8:
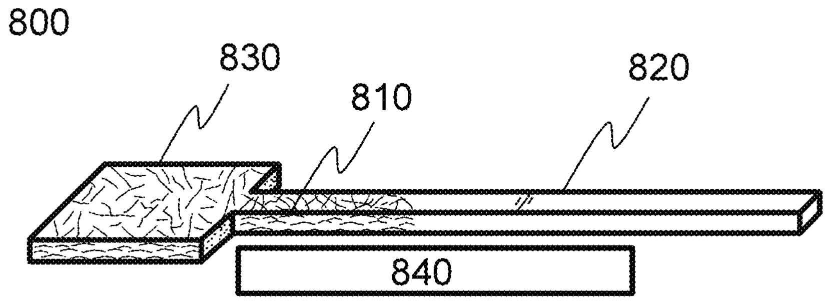
FIG. 8 illustrates using a magnetoresistance sensor in accordance with one of the embodiments of the present disclosure.

In another embodiment, the embedded functional particles are magnetic microspheres or nanoparticles that exhibit magnetic properties. The magnetic microspheres or nanoparticles are typically made of ferromagnetic materials. Referring to FIG. 8, the thermal process monitor 800 comprises a compartment 830 filled with an expandable powder-like material embedded with magnetic particles 810. When heated, the embedded magnetic particles redistributed along with the expanded powder-like material into the elongated portion 820. The material of the wall of the elongated portion 820 is penetrable by magnetic field. In a temperature range below the Curie temperature, the redistribution of the magnetic particles results in a change in the magnetic field nearby, which can be detected and recorded with a distributed magnetoresistance sensor 840 placed in a close proximity to the elongated portion of the monitor.

Figure 9:
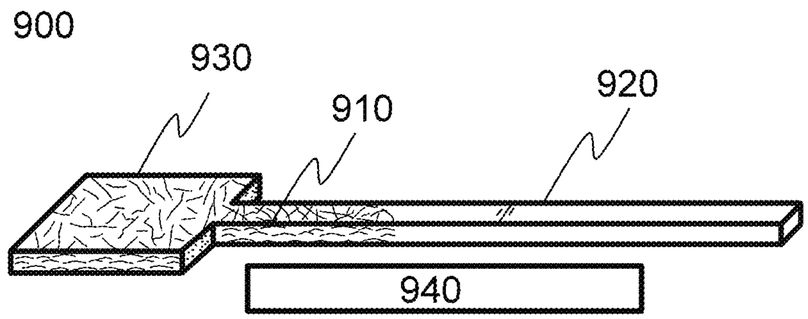
FIG. 9 illustrates using a capacitance sensor in accordance with one of the embodiments of the present disclosure.

In another embodiment, the embedded functional particles are electric conductive or electrophoretic particles microspheres or nanoparticles that changes the nearby dielectric field. Referring to FIG. 9, the thermal process monitor 900 comprises a compartment 930 filled with an expandable powder-like material embedded with electric conductive or electrophoretic particles 910. When heated, the embedded electric conductive or electrophoretic particles redistributed along with the expanded powder-like material into the elongated portion 920. The redistribution of the electric conductive or electrophoretic particles results in a change in the dielectric field nearby, which can be detected and recorded with a distributed capacitance sensor 940 placed in a close proximity to the elongated portion of the monitor.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

The invention claimed is:

1. A thermal process monitor comprising:

a compartment filled with a temperature sensitive powder-like material;

an enclosed elongated housing attached to the compartment;

wherein the powder-like material is expandable in response to increase in temperature resulting in its volume expansion into the elongated housing; the volume expansion is irreversible against a subsequent decrease in temperature;

and a sensor configured to measure the volume expansion and to determine a thermal characteristic in a heating process.

2. The thermal process monitor of claim 1, wherein the elongated housing is penetrable by electromagnetic field or visible light.

3. The thermal process monitor of claim 1, wherein said temperature sensitive powder-like material is embedded with functional particles to indicate its volume expansion in the elongated housing.

4. The thermal process monitor of claim 3, wherein the functional particles are fluorescent particles and the sensor is an optical sensor.

5. The thermal process monitor of claim 3, wherein the functional particles are magnetic particles and the sensor is a magnetoresistance sensor.

6. The thermal process monitor of claim 3, wherein the functional particles are electric conductive or electrophoretic particles and the sensor is a capacitance sensor.

7. The thermal process monitor of claim 1, wherein the temperature sensitive powder-like material is in the form of flakes or microspheres.

8. The thermal process monitor of claim 1, wherein the temperature sensitive powder-like material comprises expandable graphite flakes.

9. The thermal process monitor of claim 8, wherein the size of the expandable graphite flakes is substantially uniform.

10. The thermal process monitor of claim 1, wherein the temperature sensitive powder-like material comprises expandable polymer flakes or microspheres, containing foaming agents that expand when exposed to heat.

11. The thermal process monitor of claim 10, wherein the material of the expandable polymer flakes or microspheres is selected from the group of polystyrene, polyethylene, polypropylene, polyurethane, and polyvinyl chloride.

12. The thermal process monitor of claim 1, wherein the monitor is embedded in a silicon wafer.

* * * * *